(12) United States Patent
Henne

(10) Patent No.: US 8,517,904 B2
(45) Date of Patent: Aug. 27, 2013

(54) MOUNTING STRUCTURE HAVING DIRECTION-DEPENDENT RESILIENT PROPERTIES FOR MOUNTING A DEVICE WITH A ROTOR

(75) Inventor: Sebastian Henne, Goettingen (DE)

(73) Assignee: Thermo Electron LED GmbH, Langenselbold (DE)

( * ) Notice: Subject to any disclaimer, the term of this patent is extended or adjusted under 35 U.S.C. 154(b) by 843 days.

(21) Appl. No.: 12/638,085

(22) Filed: Dec. 15, 2009

(65) Prior Publication Data
US 2010/0160138 A1    Jun. 24, 2010

(30) Foreign Application Priority Data
Dec. 18, 2008 (DE) .................. 10 2008 063 632

(51) Int. Cl.
*B04B 9/14* (2006.01)
*F16F 3/093* (2006.01)

(52) U.S. Cl.
USPC .............................................. 494/82; 494/83

(58) Field of Classification Search
USPC .............. 494/1, 12, 16, 20, 82–84, 14–15, 494/60–61, 38–41; 68/23.1, 23.3; 464/180; 210/144, 363; 74/572, 574, 572.4, 574.4; 384/215, 220, 535, 536, 581, 582
See application file for complete search history.

(56) References Cited

U.S. PATENT DOCUMENTS

| | | | | |
|---|---|---|---|---|
| 1,679,890 A | * | 8/1928 | Baldwin | 310/157 |
| 3,692,236 A | * | 9/1972 | Livshitz et al. | 494/20 |
| 3,804,324 A | * | 4/1974 | Sinn et al. | 494/14 |
| 4,079,882 A | * | 3/1978 | Mizuyoshi et al. | 494/60 |
| 4,099,667 A | * | 7/1978 | Uchida | 494/7 |
| 4,193,536 A | * | 3/1980 | Kubota | 494/14 |
| 4,221,325 A | * | 9/1980 | Kubota | 494/14 |
| 5,199,937 A | * | 4/1993 | Wada et al. | 494/7 |
| 5,921,150 A | * | 7/1999 | Romanauskas | 464/180 |
| 6,338,708 B1 | * | 1/2002 | Miura et al. | 494/82 |
| 7,107,601 B2 | * | 9/2006 | Arai | 720/651 |
| 7,850,590 B2 | * | 12/2010 | Mackel et al. | 494/14 |
| 8,092,362 B2 | * | 1/2012 | Kohlstette et al. | 494/82 |
| 2010/0160138 A1 | * | 6/2010 | Henne | 494/83 |

FOREIGN PATENT DOCUMENTS

| | | |
|---|---|---|
| DE | 1 089 506 B | 9/1960 |
| DE | 2 115 866 A1 | 10/1972 |
| DE | 43 25 913 A1 | 2/1995 |
| EP | 0 632 211 A1 | 1/1995 |
| EP | 0 637 699 A1 | 2/1995 |
| JP | 6-40495 U | 5/1994 |

(Continued)

OTHER PUBLICATIONS

German Patent Office, Office Action, Application No. 10 2008 063 632.0-12, mailed Oct. 16, 2009 (4 pages).
United Kingdom Intellectual Property Office, Patents Act 1977: Search Report Under Section 17, Application No. GB0921848.8, Date of Search Mar. 22, 2010 (1 page).

(Continued)

*Primary Examiner* — Charles E Cooley
(74) *Attorney, Agent, or Firm* — Wood, Herron & Evans, LLP

(57) ABSTRACT

A mounting structure is provided for mounting a device comprising at least one mounting shield, a pivot bearing arranged in the mounting shield and a rotor mounted in the pivot bearing and having an axis of rotation. The mounting structure has resilient properties that are dependent on directions perpendicular to the axis of rotation of the rotor.

16 Claims, 3 Drawing Sheets

(56) References Cited

FOREIGN PATENT DOCUMENTS

| | | |
|---|---|---|
| JP | 09010631 A * | 1/1997 |
| JP | 10-281219 A | 10/1998 |
| JP | 2001-353744 A | 12/2001 |
| JP | 2006-102603 A | 4/2006 |
| JP | 2007-331746 A | 12/2007 |
| WO | 2006/135283 A1 | 12/2006 |

OTHER PUBLICATIONS

Japanese Patent Office, Office Action, Patent Application No. 2009-287105, dated Oct. 5, 2010 (6 pages).

State Intellectual Property Office of the People's Republic of China, Notification of the First Office Action, Patent Application No. 200910262490.1, dated Apr. 26, 2011 (12 pages).

* cited by examiner

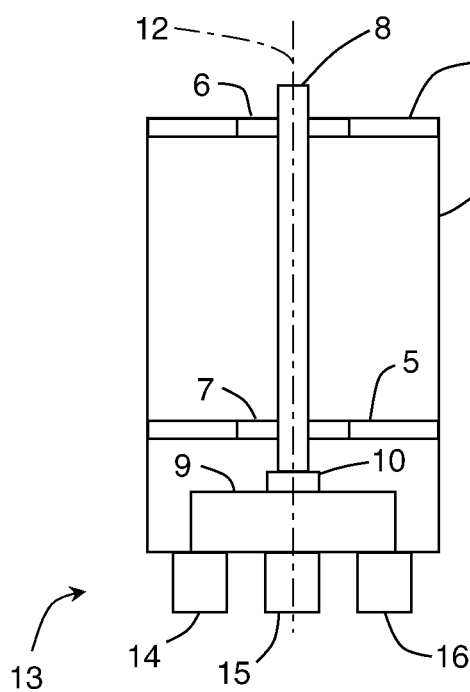
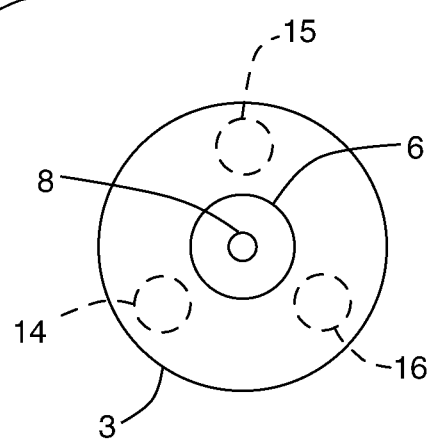
Fig. 3a    Fig. 3b
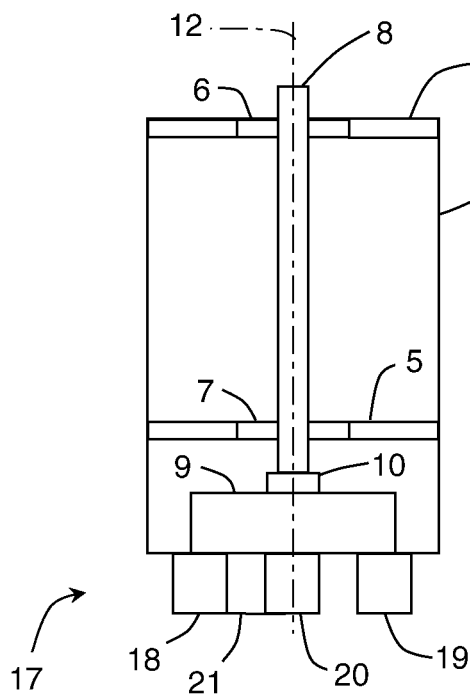
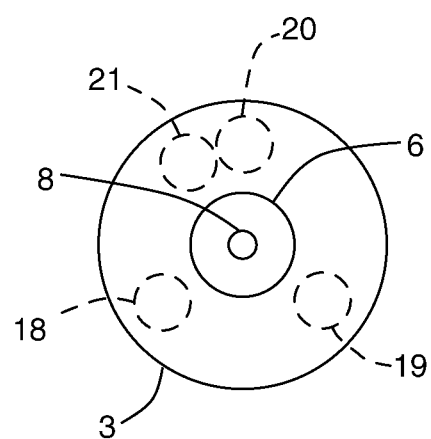
Fig. 4a    Fig. 4b

MOUNTING STRUCTURE HAVING DIRECTION-DEPENDENT RESILIENT PROPERTIES FOR MOUNTING A DEVICE WITH A ROTOR

RELATED APPLICATION

The present application claims the priority under 35 U.S.C. §119 of German Patent Application No. 102008063632.0, filed Dec. 18, 2008, the disclosure of which is hereby incorporated herein by reference in its entirety.

FIELD OF THE INVENTION

The present invention relates to a mounting means for mounting a device comprising at least one mounting shield, a pivot bearing arranged in the mounting shield and also a rotor mounted in the pivot bearing, an axis of rotation of the rotor being oriented substantially perpendicularly when the device is mounted on the mounting means, and the mounting means having resilient properties. For example, the mounting means can be provided for mounting a motor, which has rotatably mounted elements such as for example a shaft, or a centrifuge.

BACKGROUND OF THE INVENTION

In real devices with rotating rotors, mass distributions which are not completely rotationally symmetrical give rise to centrifugal and bearing forces which lead to elastic deformation of the rotor and are also the cause of vibrating of the device and the production of noise. As the speed of the rotor rises, the centrifugal and bearing forces increase. However, if the speed of the rotor exceeds a critical speed referred to as the resonance speed, then the deformation of the rotor decreases again as the speed rises. Above the resonance speed, what is known as the limit speed occurs in many devices.

Once the speed of the rotor has passed through the limit speed, it is possible to discern undamped natural oscillations of the rotor that are due to external excitations such as for example to external impacts for which friction mechanisms on the rotating rotor, sliding bearing effects, etc. may be responsible. These natural oscillations build up more and more intensively over time and can lead to instability of the device or to damage thereto.

For these reasons, during operation of the device, a value which is above the resonance speed and below the limit speed is preferably selected for the speed of the rotor. In this case, efforts are made to keep the resonance speed as low as possible, both for reasons of volume during operation and for reasons of runnability, whereas the limit speed should be set as high as possible in order to ensure a dynamically stable operation of the device even at high speeds. In particular when the device is a centrifuge or a part of a centrifuge, high speeds are desirable, as these are accompanied by a high separative power of the centrifuge.

In order to avoid unstable states of the device and possible damage thereto, it is known to damp oscillations excited by external impacts. In damping, a distinction is drawn between internal and external damping. Internal damping is determined, as a result of structural design, by the clamping fits, friction, play and rigidity of all rotating components. External damping, on the other hand, is directly dependent on the mounting.

In addition to the rigidities and points of application of the mounting, the damping of the material used has, in particular, a direct influence here. The limit speed is, in turn, dependent on the external damping-to-internal damping ratio, since whereas internal damping has a co-rotating, and therefore destabilizing, effect, external damping has a stationary, and therefore stabilizing, effect. For mounting the device, preference is therefore generally given to a mounting means which has resilient properties and the tasks of which include the damping of unbalance-excited oscillations and also the avoidance of extreme bearing forces.

Usually, a mounting means of this type has rubber buffers, which are arranged rotationally symmetrically around the axis of rotation of the rotor, as mounting elements. Although rubber buffers are inexpensive, they have the drawback that, in rubber, damping properties and spring properties are dependent on one another within narrow limits and cannot be set independently of one another in any desired manner so that, in rubber buffers, the effectiveness of the damping is subject to limits imposed by the type of material. Although it is possible to get around the aforementioned restrictions using spring systems with a parallel, for example viscous, damper, spring systems of this type are comparatively expensive.

Therefore, there is a need to increase, in a device with a rotor which is oriented perpendicularly during operation, the limit speed in a cost-effective manner.

SUMMARY OF THE INVENTION

According to aspects of the present invention, there is provided for the device a mounting means, the resilient properties of which are direction-dependent and in particular orthotropic. In this case, the resilient properties can be circumscribed or quantified by the modulus of elasticity of a material, or they can correspond to the modulus of elasticity of a material. A directional dependence of the resilient properties is then equivalent to a direction-dependent modulus of elasticity.

Generally speaking, the term "orthotropic" is used to describe materials which have direction-dependent elasticity properties but in which no coupling occurs between elongations and shear distortions. As a consequence of the direction-dependent resilient properties of the mounting means, oscillations excited by the rotary movement of the rotor strike a mounting, the pivot point of which does not coincide, unlike in conventional mounting means, with the axis of rotation of the rotor, but is arranged set apart therefrom or acentrically thereto. This makes it much more difficult to excite the mounting means to form unstable oscillations, so that such oscillations are effectively damped. This leads to an increase in the limit speed which may not be exceeded in order for the device to run stably, wherein expensive and high-wearing damping elements, such as viscous dampers, friction dampers, etc., may be dispensed with. The higher the directional dependence or the orthotropy of the resilient properties is, the higher the values are that can be achieved for the limit speed, and the lower the rigidity of the mounting means is, the higher the directional dependence of the resilient properties can be.

Advantageously, the resonance speed is in this case not increased. Thus, neither the volume occurring during operation of the device nor bearing forces occurring during operation are increased; this, in turn, has an advantageous effect on the service life of the device.

Furthermore, the invention allows internal damping to be increased in cases in which an increase in internal damping is, while not desirable, nevertheless inevitable as a result of structural design. Such cases usually occur in relatively complex rotor designs such as what are known as "biodense"

rotors, which consist of a large number of interconnected individual components, or on use of self-locking shaft/hub couplings.

As oscillations excited by external impacts have predominantly oscillation components which are perpendicular to the axis of rotation, the resilient properties are advantageously dependent on directions perpendicular to the axis of rotation of the rotor of the device mounted on the mounting means in order to effectively damp said oscillation components.

Various embodiments are possible for the mounting means. For example, the mounting means can be formed in one piece. In particular, the mounting means can comprise at least one mounting element. Direction-dependent resilient properties of the mounting means may be brought about, both in one-piece mounting means and within individual mounting elements, for example by hollow spaces which have a direction-dependent distribution density and/or the size of which varies as a function of direction. Or else partial regions of a one-piece mounting means or a mounting element are subjected, depending on the material of the mounting means or the mounting element for generating elasticity properties which differ from region to region or change continuously, to different treatments at, for example, various temperatures, pressures or ambient atmospheres.

In so far as the mounting means comprises two or more mounting elements, the mounting elements can be arranged rotationally symmetrically in relation to the axis of rotation of the rotor of the device mounted on the mounting means, at least two of the mounting elements having different moduli of elasticity.

For example, it is already sufficient for generating direction-dependent resilient properties if, in the case of mounting elements which are arranged rotationally symmetrically and have otherwise identical moduli of elasticity, a single mounting element has a modulus of elasticity which differs from that of the remaining mounting elements, wherein the modulus of elasticity of this mounting element can be greater or less than the modulus of elasticity of the remaining mounting elements.

On the other hand, the mounting means can also comprise a plurality of mounting elements arranged non-symmetrically in relation to an axis of rotation of the rotor of the device mounted on the mounting means. In a mounting means of this type, a desired directional dependence of the resilient properties may easily be formed by arranging the mounting elements accordingly. In this case, at least two of the mounting elements can be arranged adjacently.

For example, in a mounting means with rotationally symmetrically arranged mounting elements all having the same modulus of elasticity, it is easy to provide a further mounting element which has just such a modulus of elasticity and is arranged adjacently to one of the mounting elements, wherein the two adjacent mounting elements can be arranged touching each other or without touching each other.

Alternatively thereto, one of the mounting elements can also be designed differently from the remaining mounting elements. Even in a non-rotationally symmetrical arrangement of the mounting elements, at least two of the mounting elements can have different moduli of elasticity in order to intensify the direction-dependent properties of the mounting means.

In cases in which, in rotationally symmetrically or non-rotationally symmetrically arranged mounting elements, two mounting elements have different moduli of elasticity, one of the mounting elements can have hollow spaces, while at least one mounting element is free of hollow spaces.

In one embodiment, the mounting means is made, for reasons of cost and also for reasons of ease of obtainability, at least partly of rubber, or at least one of the mounting elements is made of rubber. On account of the direction-dependent resilient properties, the dependence of the damping and spring properties, such as is typical of rubber, has been found in the invention no longer to be disadvantageous.

The mounting means can be embodied so as to be completely separate from the device to be mounted by it. Preferably, however, at least a part of the mounting means is separably or inseparably connected to the device in order to be able to rapidly and simply mount or put down the device at all times. Thus, in particular some or all the mounting elements of a mounting means can, for example, be separably or inseparably connected to the device. In principle, the connection can be performed in all possible ways, such as for example by screwing, riveting, plugging, adhesive bonding, soldering, welding, clamping, etc.

The pivot bearings of the device are preferably in the form of a rolling bearing or a sliding bearing. However, other suitable bearings can also be used as pivot bearings.

Furthermore, the device can be a motor or comprise a motor or comprise a motor for driving the rotor or be able to be connected to a motor of this type. Preferably, the device then has a shaft/hub coupling, and in particular a self-locking shaft/hub coupling, which is a standardised type of connection for transmitting torques and powers from a shaft or a journal to a rotating hub. Moreover, alternatively or additionally, the rotor can also be manually drivable and the device can, for example, have a crank handle drive for this purpose.

In one embodiment, the device is a centrifuge or a part of a centrifuge, for example the motor thereof. In so far as the device is a centrifuge, the device can furthermore have a coupling means and a centrifuge rotor which can be cantilever-mounted, the rotor and centrifuge rotor being joined together via the coupling means in order to drive the centrifuge rotor by means of the rotor. However, other elements can also be coupled onto the device in a self-supporting manner. Furthermore, the device can, for example, be mounted within a housing by means of the mounting means.

BRIEF DESCRIPTION OF THE DRAWINGS

The invention will be described hereinafter in greater detail with reference to the drawings, in which:

FIG. 1a is a schematic cross section through an arrangement with a mounting means according to a first embodiment and a device mounted thereon;

FIG. 1b is a plan view onto the arrangement from FIG. 1a;

FIG. 3a is a schematic cross section through an arrangement with a mounting means according to a second embodiment and a device mounted thereon;

FIG. 3b is a plan view onto the arrangement from FIG. 3a;

FIG. 4a is a schematic cross section through an arrangement with a mounting means according to a third embodiment and a device mounted thereon;

FIG. 4b is a plan view onto the arrangement from FIG. 4a; and

DETAILED DESCRIPTION OF THE INVENTION

Figures 1A, 1B:
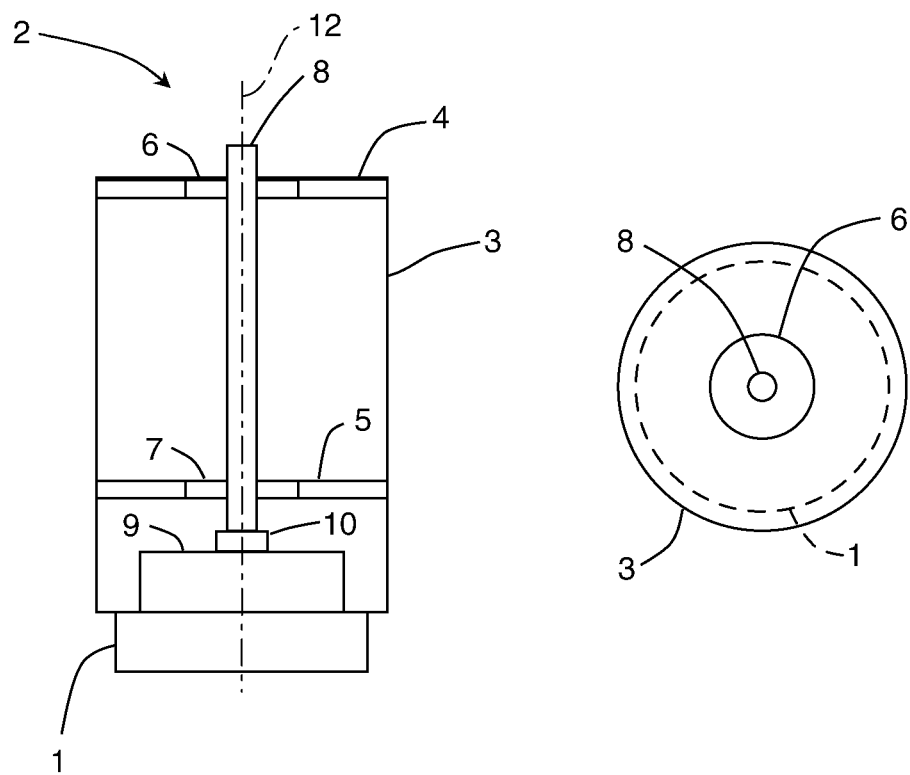

Referring now to the figures, FIG. 1a is a schematic cross section through an arrangement, which is illustrated in highly simplified form, with a mounting means 1 made of a rubber material according to a first embodiment and a device 2 mounted thereon. FIG. 1b is a plan view of the arrangement from FIG. 1a. The device 2 comprises a substantially cylindrical housing 3, an upper mounting shield 4 arranged in the housing 3 and a lower mounting shield 5, a pivot bearing 6 arranged in the upper mounting shield 4 and a pivot bearing 7 arranged in the lower mounting shield 5, and also a shaft 8, which is mounted in the pivot bearings 6 and 7 so as to be able to rotate about an axis of rotation 12, as the rotor. Furthermore, the device 2 comprises, as the drive for the shaft 8, a motor 9 which is also arranged in the housing 3 and connected to the shaft 8 via a shaft/hub coupling 10.

In the present case, sliding bearings are provided for both pivot bearings 6 and 7. Alternatively, however, both pivot bearings 6 and 7 can also be embodied as rolling bearings; however, it is also possible for just one of the pivot bearings 6 and 7 to be a rolling bearing and the respective other of the pivot bearings 6 and 7 to be a sliding bearing. Furthermore, in the arrangement shown, the mounting means 1 is not connected to the device 2, wherein it would without restrictions also be possible to join together the device 2 and mounting means 1 separably, for example by means of screw connections, or inseparably, for example by adhesive bonding.

Figure 2:
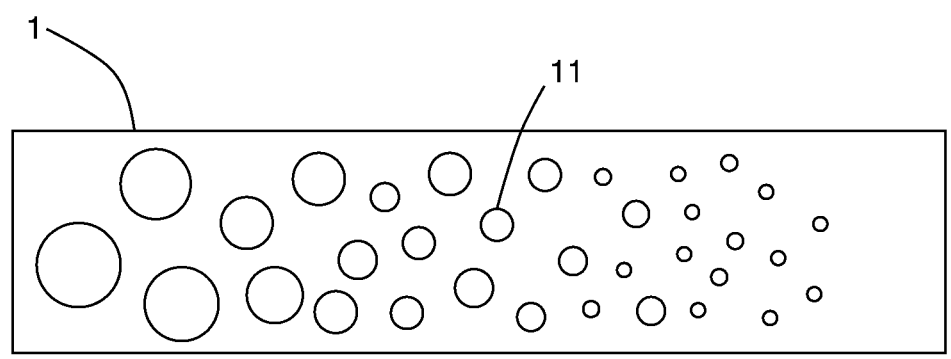
FIG. 2 is a cross section through a one-piece mounting means.

The cross section through the mounting means 1, such as may be seen in FIG. 2, shows that the mounting means 1 has in its interior a large number of round hollow spaces 11, the distribution density and also diameter of which decrease continuously in FIG. 2 from left to right. An outermost right portion of the mounting means 1 is even entirely free of hollow spaces 11. As a consequence of the hollow spaces 11, the mounting means 1 has different resilient properties on the left-hand side as shown in FIG. 2 to those on the right-hand side as shown in FIG. 2. On the left-hand side, where the distribution density of the hollow spaces 11 and also the diameters thereof are greatest, the mounting means 1 is much more resilient than on the right-hand side, where fewer hollow spaces 11 or no hollow spaces at all are located. As a result, the resilient properties of the mounting means 1 increase continuously from right to left, and in particular perpendicularly to the axis of rotation 12, and are therefore direction-dependent.

During operation of the device 2, the shaft 8 is driven by the motor 9 via the shaft/hub coupling 10 and rotates at a specific speed, which is above the resonance speed of the device 2, within the pivot bearings 6 and 7 about the axis of rotation 12. Undamped natural oscillations occur on account of external impacts for which friction mechanisms on the rotating shaft 8, sliding bearing effects, etc. are responsible. However, because the resilient properties of the mounting means 1 are dependent on a direction perpendicular to the axis of rotation 12, these oscillations are damped with different degrees of intensity in various directions; in other words, a pivot point of the mounting means 1 does not lie on the axis of rotation 12 but is displaced relative thereto. This makes it difficult for oscillations to build up and the limit speed of the device 2 is increased as a result.

FIG. 3a shows an arrangement in which the device 2 is mounted on a differently embodied mounting means 13 according to another aspect of the present invention. FIG. 3b is a plan view of this arrangement. The mounting means 13 comprises, by way of example, three mounting elements 14, 15, 16 arranged rotationally symmetrically around the axis of rotation 12 of the shaft 8. None of the mounting elements 14, 15, 16 is connected to the device 2; however, alternatively, it is possible to form as many as desired or all of the mounting elements 14, 15 and 16 so as to be separably or non-separably connected, as described above, to the device 2.

The two mounting elements 14 and 15 have identical resilient properties. Conversely, the resilient properties of the mounting element 16 differ from those of the mounting elements 14 and 15, thus making the resilient properties of the mounting means 13 direction-dependent. Thus, the mounting element 16 can be more resilient than the mounting elements 14 and 15 because it has, for example, hollow spaces which, in contrast to the mounting means 1 shown in FIG. 2, are distributed homogeneously within the mounting element 16. Or else the mounting element 16 is embodied so as to be less resilient than the mounting elements 14 and 15 because the mounting elements 14 and 15 now have hollow spaces of this type. Equally, it is possible for none of the mounting elements 14, 15 and 16 to have hollow spaces and different resilient properties are achieved for the mounting elements 14, 15 and 16 by suitably selecting the materials of which the respective mounting elements 14, 15 and 16 are made. Like the mounting means 1, the mounting means 13 also has, as a consequence of its direction-dependent resilient properties, resilient properties which are direction-dependent in directions perpendicular to the axis of rotation 12 and the effect of which is the same as in the mounting means 1.

FIG. 4a is a cross section and FIG. 4b is a plan view of an arrangement in which the device 2 is mounted in accordance with a further embodiment of a mounting means 17 according to the invention.

The mounting means 17 comprises, by way of example, four mounting elements 18, 19, 20 and 21 each having identical resilient properties, wherein each of the mounting elements 18, 19, 20, 21 can have or else can not have hollow spaces. Three of the mounting elements 18, 19, 20 and 21, namely the mounting elements 18, 19, 20, are arranged, as in the mounting means 13, rotationally symmetrically to the axis of rotation 12. On the other hand, the fourth mounting element 21 is arranged directly adjacently to the mounting element 20, both mounting elements 20 and 21 touching each other. Overall, the arrangement shown of the mounting element 21 breaks the rotational symmetry relative to the axis of rotation 12; the mounting elements 18, 19, 20 and 21 are arranged non-symmetrically in relation to the axis of rotation 12. Furthermore, the adjacent arranging of the mounting elements 20 and 21 causes the mounting means 17 to be less resilient in the environment thereof than in the respective environment of the mounting elements 18 and 19. In directions which point away from the mounting elements 20 and 21 and are perpendicular to the axis of rotation 12, the resilient properties of the mounting means 17 accordingly increase. In alternative embodiments of the mounting means 17, individual mounting elements 18, 19, 20, 21 can also have different moduli of elasticity.

Figure 5:
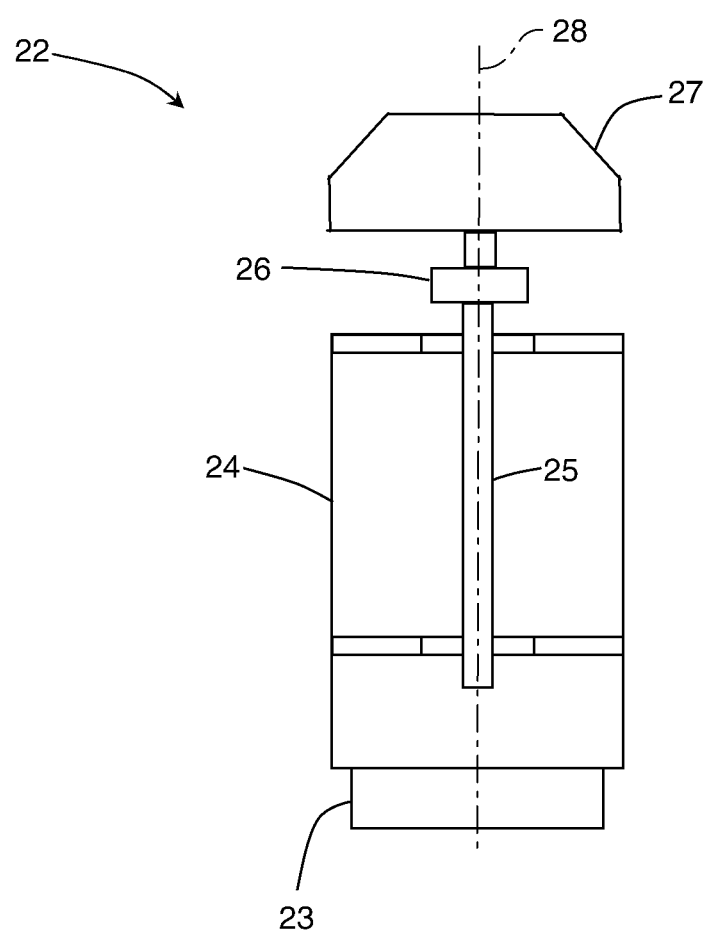
FIG. 5 shows a centrifuge mounted on a mounting means.

Finally, FIG. 5 shows a centrifuge 22 which is mounted on a mounting means 23 having direction-dependent resilient properties. The embodiment of the mounting means 23 corresponds to the embodiment of any desired one of the mounting means 1, 13 or 17 described hereinbefore. The centrifuge 22 comprises a motor 24 with a rotatably mounted rotor 25, a coupling means 26 and a cantilever-mounted centrifuge rotor 27. The rotor 25 and the centrifuge rotor 27 are joined together by means of the coupling means 26.

When the centrifuge 22 is in operation, the centrifuge rotor 27 is driven by the rotating rotor 25 of the motor 24 via the coupling means 26. The rotor 25 and centrifuge rotor 27 rotate about an axis of rotation 28 at a specific speed above the resonance speed of the centrifuge 22. In this case, the mounting means 23, owing to its direction-dependent resilient properties, makes it difficult for undamped natural oscillations to build up and ensures as a result that the limit speed of the centrifuge 22 is increased.

What is claimed is:

1. An assembly, comprising:
   a mounting structure; and
   a device mounted on the mounting structure, the device comprising:
      at least one mounting shield;
      a pivot bearing arranged in the mounting shield; and
      a rotor mounted in the pivot bearing and having an axis of rotation,
   wherein the mounting structure has resilient properties that are dependent on directions perpendicular to the axis of rotation of the rotor of the device mounted on the mounting structure so that a pivot point of the mounting structure, on which oscillations excited by rotary movement of the rotor strike, does not coincide with the axis of rotation of the rotor, and is arranged set apart therefrom or acentrically thereto.

2. The assembly according to claim 1, wherein the mounting structure has hollow spaces which have a direction-dependent distribution density and/or the size of which varies as a function of direction perpendicular to the axis of rotation of the rotor.

3. The assembly according to claim 1, wherein the mounting structure has at least two mounting elements arranged rotationally symmetrically in relation to the axis of rotation of the rotor, at least two of the mounting elements having different moduli of elasticity.

4. The assembly according to claim 3, wherein the mounting structure comprises a plurality of mounting elements arranged non-symmetrically in relation to the axis of rotation.

5. The assembly according to claim 4, wherein at least two of the mounting elements are arranged adjacently.

6. The assembly according to claim 4, wherein at least two of the mounting elements have different moduli of elasticity.

7. The assembly according to claim 3, wherein at least one mounting element has hollow spaces, while at least one mounting element is free of hollow spaces.

8. The assembly according to claim 1, wherein the mounting structure is made at least partly of rubber.

9. The assembly according to claim 1, wherein at least a part of the mounting structure is separably or inseparably connected to the device.

10. The assembly according to claim 1, wherein the pivot bearing is a rolling bearing or a sliding bearing.

11. The assembly according to claim 1, wherein the device is a motor.

12. The assembly according to claim 1, wherein the rotor is manually drivable.

13. The assembly according to claim 1, wherein the device is a centrifuge or part of a centrifuge.

14. The assembly according to claim 1, wherein the resilient properties of the mounting structure are orthotropic.

15. The assembly according to claim 1, wherein the device comprises a motor.

16. The assembly according to claim 1, wherein the device is connectable to a motor.

* * * * *